(12) United States Patent
Kawamorita et al.

(10) Patent No.: US 12,517,613 B2
(45) Date of Patent: Jan. 6, 2026

(54) TOUCH DISPLAY DEVICE WITH DRIVE CIRCUIT THAT SUSPENDS HIGH LEVEL VOLTAGE TO LATCH TRANSISTOR DURING TOUCH DETECTION

(71) Applicant: Sharp Display Technology Corporation, Kameyama (JP)

(72) Inventors: Seiya Kawamorita, Kameyama (JP); Satoshi Horiuchi, Kameyama (JP); Yasuaki Iwase, Kameyama (JP); Shinji Matsubara, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/888,359

(22) Filed: Sep. 18, 2024

(65) Prior Publication Data

US 2025/0123715 A1 Apr. 17, 2025

(30) Foreign Application Priority Data

Oct. 13, 2023 (JP) .................. 2023-177895

(51) Int. Cl.
*G06F 3/041* (2006.01)
*G09G 3/36* (2006.01)
*G11C 19/28* (2006.01)

(52) U.S. Cl.
CPC ........ *G06F 3/04184* (2019.05); *G06F 3/0412* (2013.01); *G09G 3/3677* (2013.01); *G11C 19/28* (2013.01); *G09G 2310/0267* (2013.01); *G09G 2310/0286* (2013.01)

(58) Field of Classification Search
CPC . G06F 3/0412; G06F 3/04184; G09G 3/3677; G09G 2310/0267; G09G 2310/0286; G11C 19/28
See application file for complete search history.

(56) References Cited

U.S. PATENT DOCUMENTS

| | | | |
|---|---|---|---|
| 10,782,810 B2* | 9/2020 | Park | G06F 3/044 |
| 2018/0196563 A1 | 7/2018 | Iwase et al. | |
| 2018/0231818 A1* | 8/2018 | Cao | G02F 1/13306 |
| 2021/0056910 A1* | 2/2021 | Chung | G09G 3/3225 |
| 2023/0214037 A1* | 7/2023 | Hwang | G06F 3/04184 345/174 |
| 2024/0203375 A1* | 6/2024 | Choi | G09G 3/3677 |

FOREIGN PATENT DOCUMENTS

WO 2017/006815 A1 1/2017

* cited by examiner

*Primary Examiner* — Liliana Cerullo
(74) *Attorney, Agent, or Firm* — ScienBiziP, P.C.

(57) ABSTRACT

A drive circuit comprising a plurality of stages comprises a latch circuit configured to retain an output signal inputted from a preceding stage in a suspension period in which the drive circuit is suspended and configured to supply the output signal to a succeeding stage when the suspension period ends, the latch circuit includes a signal retaining node; a first transistor including a first electrode supplied a first control signal when the suspension period ends and a first control electrode; a second output node connected to the first control electrode; and a second transistor including a second control electrode supplied a second control signal supplied after the suspension period starts, but before the first control signal is supplied to the first electrode, the second transistor electrically connects the signal retaining node and the second output node by the second control signal supplied to the second control electrode.

20 Claims, 9 Drawing Sheets

TOUCH DISPLAY DEVICE WITH DRIVE CIRCUIT THAT SUSPENDS HIGH LEVEL VOLTAGE TO LATCH TRANSISTOR DURING TOUCH DETECTION

CROSS-REFERENCE TO RELATED APPLICATION

The present application claims priority from Japanese Application JP2023-177895, the content of which is hereby incorporated by reference into this application.

BACKGROUND

1. Field

The present disclosure relates to drive circuits, display devices, and in-cell touch panel devices.

PCT International Application Publication No. WO2017/006815 discloses a drive circuit capable of suspending its operation in the process of scanning. This drive circuit (shift register) includes a plurality of stages each including a unit circuit. Each unit circuit includes a first unit circuit that outputs a shift pulse to a gate bus line and to a succeeding stage and a second unit circuit that outputs a shift pulse to the succeeding stage. The second unit circuit includes a transistor including a first electrode connected to the succeeding stage and an internal node connected to the control electrode of this transistor. The electrical potential of the internal node is maintained at HIGH continuously while the operation of the drive circuit is being suspended. Then, slightly before the operation of the drive circuit is to be resumed, the level of the signal supplied to the second electrode of the transistor goes HIGH. Hence, the transistor, being turned on owing to the internal node maintained at HIGH, outputs a shift pulse to the succeeding stage, thereby resuming the operation of the drive circuit.

SUMMARY

In the shift register described in PCT International Application Publication No. WO2017/006815, the internal node connected to the control electrode (gate electrode) of the transistor in the second unit circuit (latch circuit) remains at HIGH continuously while the operation is being suspended. Therefore, the properties of the transistor may in some cases change due to a HIGH (ON level) voltage being continuously applied to the gate electrode of the transistor.

Accordingly, the present disclosure has been made to address these problems and has an object to provide a drive circuit, a display device, and an in-cell touch panel device capable of preventing changes in the properties of the transistor in a latch circuit.

To address the problems, the present disclosure, in a first aspect thereof, is directed to a drive circuit including a plurality of stages and configured to supply a drive signal to a group of scan signal lines in response to an input of a plurality of clock signals, the drive circuit including a plurality of unit circuits respectively included in the plurality of stages, wherein the plurality of unit circuits include: a shift-register unit circuit connected to one scan signal line among the group of scan signal lines and configured to supply an output signal to the one scan signal line and to a succeeding stage of the shift-register unit circuit; and a latch circuit configured to retain the output signal inputted from a preceding stage in a suspension period in which supply of the plurality of clock signals is suspended to suspend operation of the drive circuit and further configured to supply an output signal to a succeeding stage of the latch circuit when the suspension period ends, the latch circuit includes: a signal retaining node; a turn-on circuit that changes a level of the signal retaining node from an OFF level to an ON level based on the output signal inputted from the preceding stage; a first output node connected to the succeeding stage; a first transistor including: a first electrode to which a first control signal is supplied when the suspension period ends; a second electrode connected to the first output node; and a first control electrode; a second output node connected to the first control electrode; and a second transistor including: a third electrode connected to the signal retaining node; a fourth electrode connected to the second output node; and a second control electrode to which a second control signal is supplied that is supplied after the suspension period starts, but before the first control signal is supplied to the first electrode, the second transistor electrically connects the signal retaining node and the second output node by the second control signal being supplied to the second control electrode, and the first transistor supplies the first control signal as an output signal to the first output node by a level of the second output node switching from the OFF level to the ON level by the signal retaining node and the second output node being electrically connected.

The present disclosure, in a second aspect thereof, is directed to a display device including: the drive circuit of the first aspect; and a display including the group of scan signal lines.

The present disclosure, in a third aspect thereof, is directed to an in-cell touch panel device including: the drive circuit of the first aspect; and an in-cell touch panel including the group of scan signal lines and configured to detect a touch made by means of an indicator in the suspension period.

According to these configurations, in a suspension period in which the operation of the drive circuit is suspended, the first control electrode of the first transistor in the latch circuit is disconnected from the signal retaining node at which the ON level is maintained. Hence, the ON level voltage is prevented from being applied continuously to the first control electrode of the first transistor in the suspension period. Consequently, the properties of the first transistor in the latch circuit can be prevented from changing.

DESCRIPTION OF EMBODIMENTS

The following will describe embodiments of the present disclosure with reference to drawings. Identical and equivalent members will be denoted by the same reference signs throughout the drawings, and description thereof is not repeated. For clarity purposes, the drawings to which reference will be made in the following description may show structures in a simplified or schematic form or omit some structural members. The relative dimensions of structural members as they are shown in the drawings may not represent the actual relative dimensions thereof.

Embodiment 1

Overall Configuration of Display Device

Figure 1:
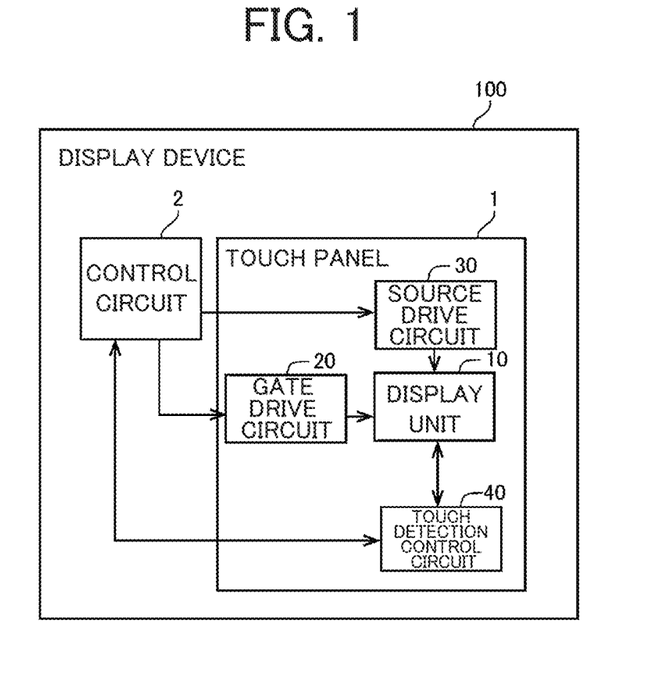
FIG. 1 is a block diagram of a structure of a display device 100 in accordance with Embodiment 1.
Figure 2:
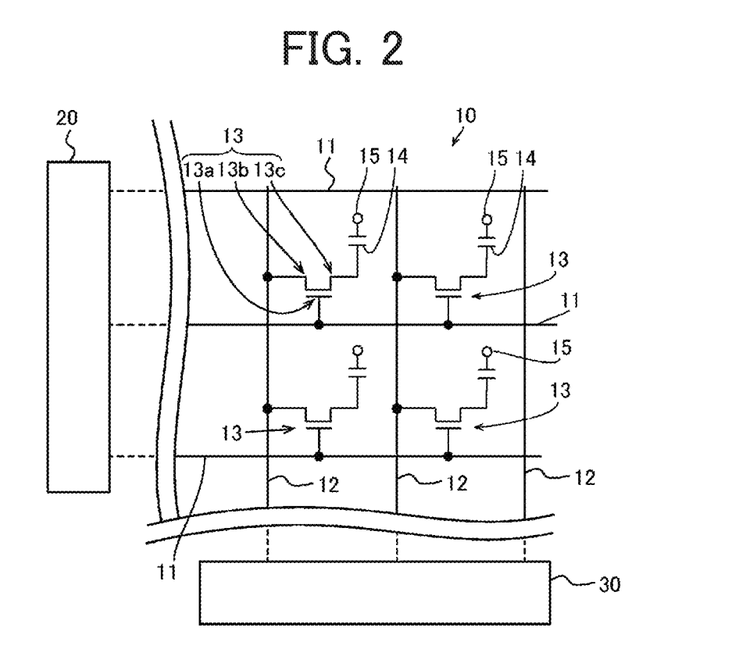
FIG. 2 is a schematic circuit diagram of a structure of a display unit 10.
Figure 3:
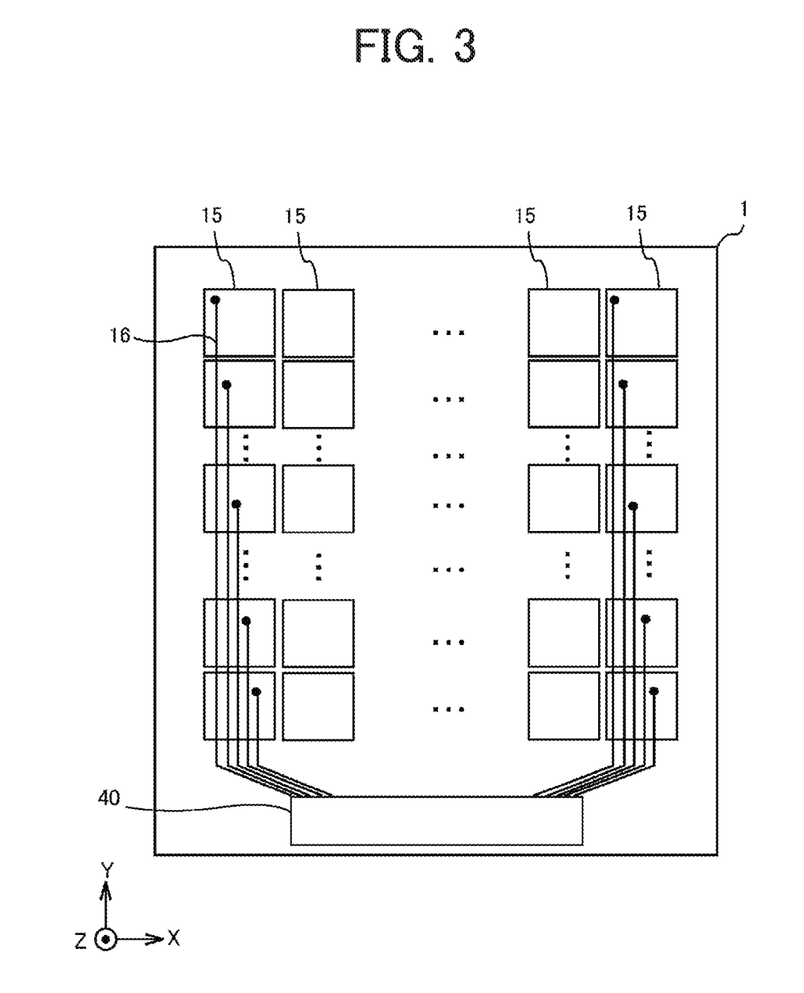
FIG. 3 is a diagram of a structure of a touch panel 1.

A description will be given of a structure of a display device 100 in accordance with Embodiment 1. FIG. 1 is a block diagram of a structure of the display device 100 in accordance with Embodiment 1. FIG. 2 is a schematic circuit diagram of a structure of a display unit 10. FIG. 3 is a diagram of a structure of a touch panel 1.

Referring to FIG. 1, the display device 100 includes the touch panel 1 and a control circuit 2. In Embodiment 1, the touch panel 1 is configured as an in-cell touch panel that implements a touch detection function and a video display function. In other words, the touch panel 1 doubles as a display. In addition, in Embodiment 1, the display device 100 is an in-cell touch panel device.

The control circuit 2 includes a processor for implementing a process of controlling the display device 100. The control circuit 2 then transmits a control signal to the touch panel 1 on the basis of an inputted video signal. The touch panel 1 displays a video on the basis of the control signal. In addition, the control circuit 2 transmits an instruction to detect a touch to the touch panel 1 and receives, from the touch panel 1, information representing touch coordinates by means of an indicator (hereinafter, will be referred to as a "touch detection process"). In addition, the control circuit 2 performs the touch detection process and a display process of causing to implement the operation by the gate drive circuit 20, by time division in a single frame period. In other words, a single frame period includes a touch detection period TP in which to implement the touch detection process (see FIG. 7) and a display period TD in which to implement the display process (see FIG. 7). The control circuit 2, for example, implements the touch detection process more than once in a single frame period. In addition, the operation of the gate drive circuit 20 is suspended during the touch detection process. In addition, a suspension period TR (see FIG. 7) in which to suspend the operation of the gate drive circuit 20 includes the touch detection period TP.

Referring to FIG. 1, the touch panel 1 includes the display unit 10, the gate drive circuit 20, a source drive circuit 30, and a touch detection control circuit 40. Note that although FIG. 1 shows the gate drive circuit 20, the source drive circuit 30, and the touch detection control circuit 40 being provided inside the touch panel 1, at least one of the gate drive circuit 20, the source drive circuit 30, and the touch detection control circuit 40 may be provided on another substrate disposed external to the touch panel 1. In such a case, the touch panel 1 is connected to at least one of the gate drive circuit 20, the source drive circuit 30, and the touch detection control circuit 40 through wiring or a flexible printed board.

Referring to FIG. 2, the display unit 10 includes a plurality of gate lines 11, a plurality of source lines 12, a plurality of transistors 13, a plurality of pixel electrodes 14, and a plurality of common electrodes 15. The plurality of gate lines 11 intersect with the plurality of source lines 12 in a plan view. The transistors 13 and the pixel electrodes 14 are then disposed in respective regions delineated by the plurality of gate lines 11 and the plurality of source lines 12. Each transistor 13 then includes a gate electrode 13a, a source electrode 13b, and a drain electrode 13c. The gate electrode 13a is connected to one of the gate lines 11. In addition, the source electrode 13b is connected to one of the source lines 12. The drain electrode 13c is connected to one of the pixel electrodes 14. The plurality of gate lines 11 are an example of a group of scan signal lines. Note that although FIG. 2 shows an example where the gate drive circuit 20 is dispose on one side of the display unit 10, the gate drive circuit 20 may be disposed on both sides of the display unit 10.

The gate drive circuit 20 is provided (monolithically) on a substrate of the touch panel 1. The gate drive circuit 20 outputs a gate signal sequentially to the plurality of gate lines 11. The source drive circuit 30 is mounted onto the substrate of the touch panel 1. The source drive circuit 30 receives a video signal and a source control signal from the control circuit 2 and generates source signals (data signals) on the basis of the video signal and the source control signal. Then, the source drive circuit 30 supplies the source signals respectively to the plurality of source lines 12. The source signals are then written to the pixel electrodes 14 via the transistors 13 when the gate signals are supplied to the transistors 13 (when the voltage is switched to a gate On voltage). Hence, an electric field is generated between the pixel electrodes 14 and the common electrodes 15, thereby driving a liquid crystal layer (not shown), to display an image on the touch panel 1.

Referring to FIG. 3, the plurality of common electrodes 15 are arranged, for example, in a matrix. The touch detection control circuit 40 is connected via wiring 16 to each of the plurality of common electrodes 15. The common electrode 15 changes electrostatic capacity as it is capacitively coupled to the indicator. The touch detection control circuit 40 supplies a touch drive signal (pulse signal) to the plurality of common electrodes 15 in the period in which to implement the touch detection process (touch detection period TP). The pulse signal has a waveform that can change with the magnitude of the electrostatic capacity of the common electrode 15. The touch detection control circuit 40 detects a touch (touch position) made by means of the indicator on the basis of the waveform of the pulse signal from the common electrode 15. In other words, the common electrode 15 doubles as a touch detection electrode. The touch panel 1 is a self-capacitance type of touch panel. Note that this is not the only feasible example, and the touch panel 1 may be structured as a mutual-capacitance type of touch panel.

Structure of Gate Drive Circuit 20

Figure 4:
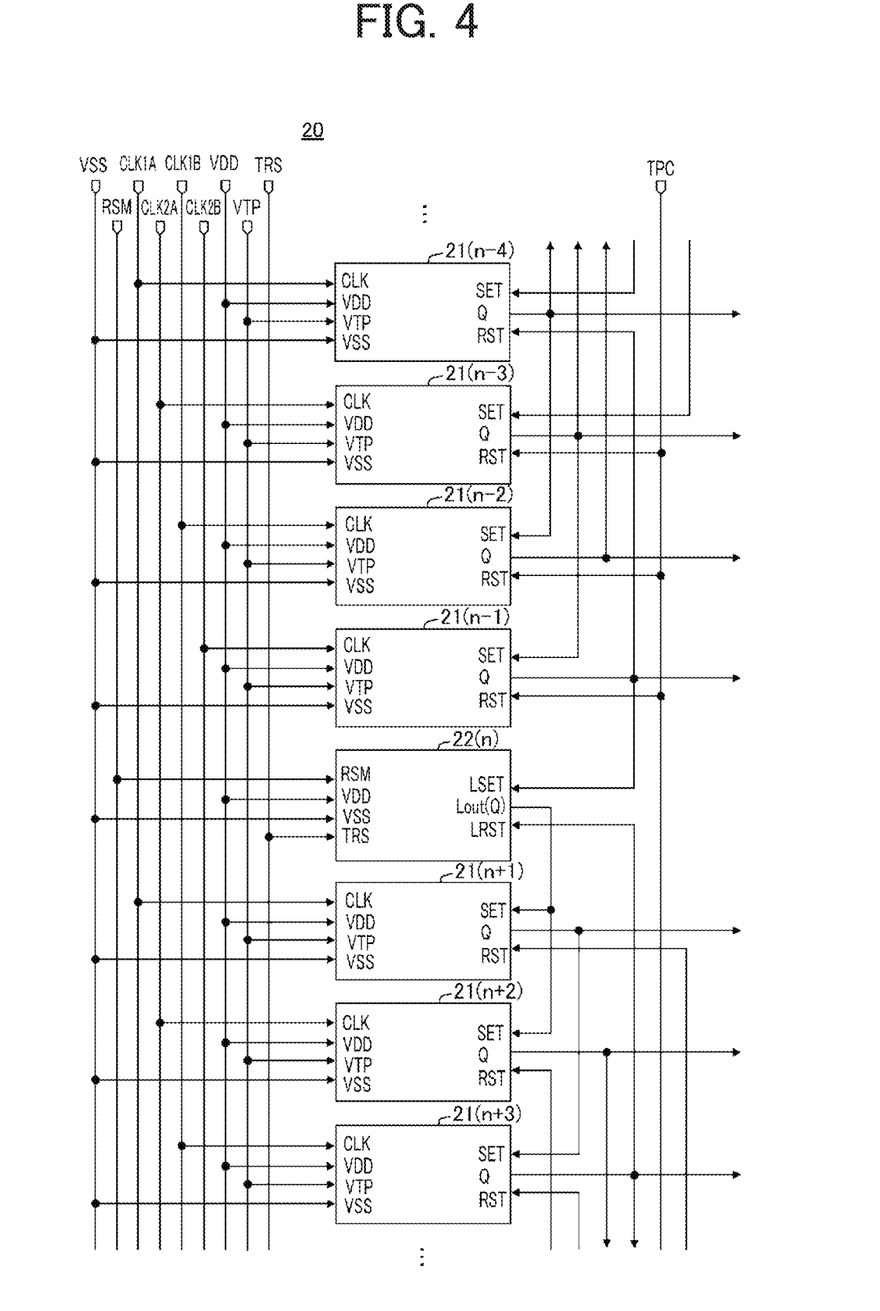
FIG. 4 is a diagram of a structure of a part of a gate drive circuit 20.
Figure 5:
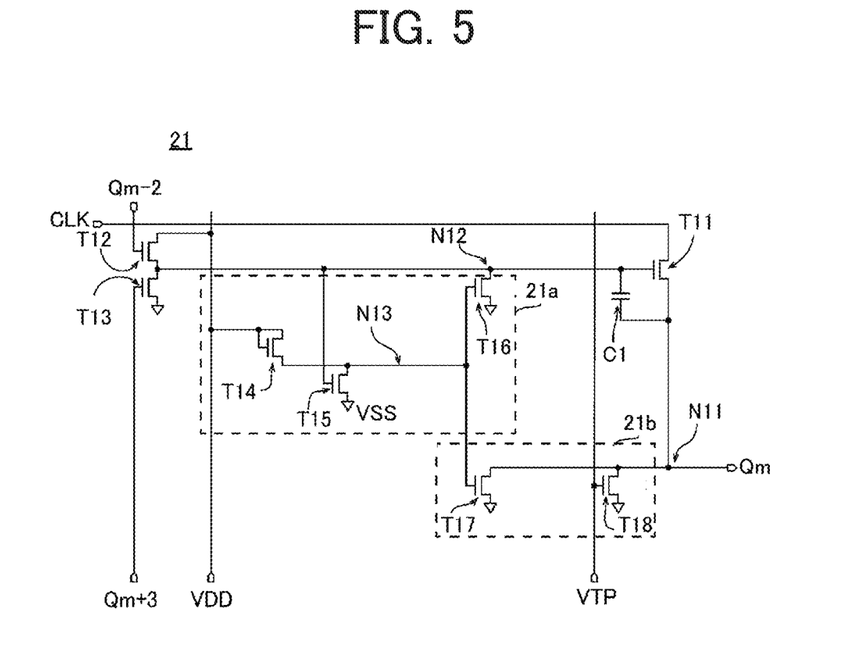
FIG. 5 is a circuit diagram of a structure of a shift-register unit circuit 21.
Figure 6:
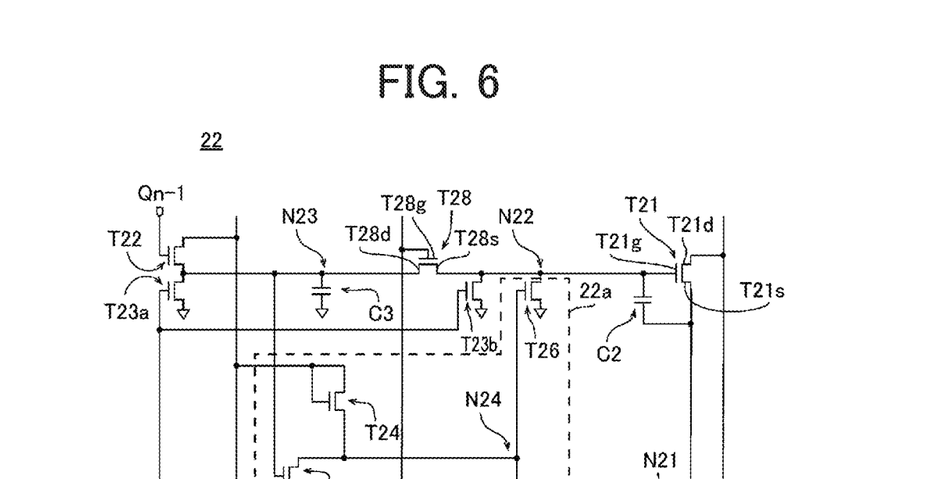
FIG. 6 is a circuit diagram of a structure of a latch circuit 22.

Next, referring to FIGS. 4 to 6, a description will be given of a structure of the gate drive circuit 20. FIG. 4 is a diagram of a structure of a part of the gate drive circuit 20. FIG. 5 is a circuit diagram of a structure of a shift-register unit circuit 21. FIG. 6 is a circuit diagram of a structure of a latch circuit 22.

Referring to FIG. 4, the gate drive circuit 20 is a shift register composed of a plurality of stages to supply gate signals to the plurality of gate lines 11 in response to an input of a plurality of clock signals. FIG. 4 shows, among the plurality of stages, an n-th stage, the four stages that precede the n-th stage, and the three stages that succeed the n-th stage, where n is a natural number.

The gate drive circuit 20 includes the shift-register unit circuits 21, which are a part of the plurality of stages, and the latch circuit 22, which is a part of the plurality of stages. FIG. 4 shows an example where the latch circuit 22 constitutes the n-th stage, and the plurality of shift-register unit circuits 21 constitute the (n−4)-th to (n−1)-th stages and the (n+1)-th to (n+3)-th stages. Note that although FIG. 4 shows a single latch circuit 22, the gate drive circuit 20 may include a plurality of latch circuits 22.

Referring to FIG. 4, the control circuit 2 (see FIG. 1) supplies, to the gate drive circuit 20, a plurality of clock signals (hereinafter, referred to as a CLK1A signal, a CLK2A signal, a CLK1B signal, and a CLK2B signal or when the CLK1A signal, the CLK2A signal, the CLK1B signal, and the CLK2B signal do not need to be distinguished from each other, as CLK signals), a VSS signal, an RSM signal, a VDD signal, a VTP signal, a TRS signal, and a TPC signal as the control signals. The VSS signal has a reference potential (LOW or OFF level). The RSM signal is for instructing a resumption of the operation of the gate drive circuit 20. The VDD signal has a reference potential (HIGH or ON level). The VTP signal is supplied in a suspension period (period in which to implement the touch detection process). The TRS signal is for instructing charging of a node N22 (detailed later). Note that the node N22 is an example of a "second output node." In addition, the control circuit 2 supplies a gate start pulse (GSP) signal to the shift-register unit circuits 21 in the first and second stages as a SET signal (not shown in FIG. 4).

Each shift-register unit circuit 21 is fed with the CLK signal, the VDD signal, the VTP signal, and the VSS signal. The shift-register unit circuit 21 supplies an output signal Q to one of the gate lines 11 and to a stage that succeeds this shift-register unit circuit 21. Note that throughout the following description, the output signal Q from the n-th stage will be referred to as the output signal Qn. As an example, letting m be a natural number, the m-th shift-register unit circuit 21 inputs an output signal Qm to the (m+2)-th stage as a SET signal. In addition, the m-th shift-register unit circuit 21 inputs the output signal Qm to the (m−3)-th stage as a RESET signal. In addition, the shift-register unit circuits 21 in the (n−3)-th to (n−1)-th stages are fed with the TPC signal as a RESET signal.

The latch circuit 22 is fed with the RSM signal, the VDD signal, the VTP signal, and the VSS signal. The latch circuit 22 is then stopped from receiving the plurality of clock signals (the CLK1A signal, the CLK2A signal, the CLK1B signal, and the CLK2B signal) to retain the output signal Q (SET signal), which is fed from the preceding stage, in the suspension period in which to suspend the operation of the gate drive circuit 20. As an example, the latch circuit 22 in the n-th stage suspends the operation of the gate drive circuit 20 when the latch circuit 22 is fed with an output signal Qn−1 as a LSET signal (a SET signal for the latch circuit 22).

The latch circuit 22 then, at the end of the suspension period, supplies an output signal (SET signal) to the succeeding stage of this latch circuit 22. As an example, the latch circuit 22, upon being fed with the TRS signal and the RSM signal, outputs an output signal Lout (output signal Qn) to the shift-register unit circuits 21 in the (n+1)-th and (n+2)-th stages. Hence, the operation of the gate drive circuit 20 is resumed.

Circuit Configuration of Shift-Register Unit Circuit 21

Referring to FIG. 5, the shift-register unit circuits 21 includes transistors T11 to T18, a capacitive element C1, and nodes N11 to N13. FIG. 5 shows the shift-register unit circuit 21 in the m-th stage.

The transistor T11 includes a drain electrode to which the CLK signal is supplied, a source electrode connected to the node N11, and a gate electrode connected to the node N12. The transistor T12 constitutes a turn-on circuit that changes the level of the node N12 from the OFF level (LOW) to the ON level (HIGH) on the basis of an output signal Qm−2 fed from a preceding stage (e.g., the (m−2)-th stage). The output signal Qm−2 is fed as a SET signal to the gate electrode of the transistor T12. The VDD signal is fed to the drain electrode of the transistor T12. The source electrode of the transistor T12 is connected to the node N12.

The transistor T13 constitutes a turn-off circuit that changes the level of the node N12 from the ON level to the OFF level on the basis of an output signal Qm+3 fed from a succeeding stage (e.g., the (m+3)-th stage). The output signal Qm+3 is fed as a RESET signal (reset signal) to the gate electrode of the transistor T13. The node N12 is connected to the drain electrode of the transistor T13. The VSS signal is fed to the source electrode of the transistor T13.

The transistors T14 to T16 constitute a stabilization circuit 21a for maintaining the node N12 at the OFF level throughout all the periods other than the period in which the node N12 is at the ON level. The transistor T14 diode-connects the VDD signal to the node N13. The node N12 is connected to the gate electrode of the transistor T15 and when the node N12 changes to the ON level, switches the node N13 from the ON level to the OFF level. The transistor T16, when the node N13 is at the ON level, supplies the VSS signal to the node N12 to maintain the node N12 at the OFF level.

The transistor T17 constitutes a stabilization circuit 21b for maintaining the node N11 at the OFF level throughout all the periods other than the period in which the node N12 is at the ON level. The transistor T17, when the node N13 is at the ON level, supplies the VSS signal to the node N11 to maintain the node N11 at the OFF level.

The gate electrode of the transistor T18 is fed with the VTP signal supplied during the touch detection period TP. The input of the VTP signal to the transistor T18 turns on the transistor T18, which switches the node N11 to the OFF level.

The capacitive element C1 is disposed between the node N11 and the node N12. The capacitive element C1 is a bootstrap capacitor.

The node N11 is connected to one of the gate lines 11 and the (m+2)-th stage.

Circuit Configuration of Latch Circuit 22

The latch circuit 22 includes transistors T21 to T28, capacitive elements C2 and C3, and nodes N21 to N24 as shown in FIG. 6.

The transistor T21 includes a drain electrode T21d fed with the RSM signal at the end of the suspension period TR, a source electrode T21s connected to the node N21, and a gate electrode T21g. The transistor T21 is a buffer transistor. Note that the RSM signal is an example of a "first control signal" in accordance with the present disclosure. The drain electrode T21d is an example of a "first electrode" in accordance with the present disclosure. The source electrode T21s is an example of a "second electrode" in accordance with the present disclosure. The gate electrode T21g is an example of a "first control electrode" in accordance with the present disclosure.

The transistor T22 constitutes a turn-on circuit that changes the level of the node N23 from the OFF level (HIGH) to the ON level (LOW) on the basis of the output signal Qn−1 fed from a preceding stage (e.g., the (n−1)-th stage). The output signal Qn−1 is fed as a LSET signal to the gate electrode of the transistor T22. The drain electrode of the transistor T22 is fed with the VDD signal. The source electrode of the transistor T22 is connected to the node N23.

A transistor T23a constitutes a turn-off circuit that changes the level of the node N23 from the ON level to the OFF level on the basis of an output signal Qn+3 fed from a succeeding stage (e.g., the (n+3)-th stage). The output signal Qn+3 is fed as a LRESET signal (latch reset signal) to the gate electrode of the transistor T23a. The drain electrode of the transistor T23a is connected to the node N23. The source electrode of the transistor T23a is fed with the VSS signal.

A transistor T23b constitutes a turn-off circuit that changes the level of the node N22 from the ON level to the OFF level on the basis of the output signal Qn+3 fed from a succeeding stage (e.g., the (n+3)-th stage). The gate electrode of the transistor T23b is fed as a LRESET signal (latch reset signal) with the output signal Qn+3. The drain electrode of the transistor T23b is connected to the node N22. The source electrode of the transistor T23b is fed with the VSS signal.

The transistors T24 to T26 constitute a stabilization circuit 22a for maintaining the node N22 at the OFF level throughout all the periods other than the suspension period TR. The transistor T24 diode-connects the VDD signal to the node N24. The node N23 is connected to the gate electrode of the transistor T25 and when the node N23 changes to the ON level, switches the node N24 from the ON level to the OFF level. The transistor T26, when the node N24 is at the ON level, supplies the VSS signal to the node N22 to maintain the node N22 at the OFF level.

The transistor T27 constitutes a stabilization circuit 22b for maintaining the node N21 at the OFF level throughout all the periods other than the suspension period TR. The transistor T27, when the node N24 is at the ON level, supplies the VSS signal to the node N21 to maintain the node N21 at the OFF level.

The transistor T28 includes: a drain electrode T28d connected to the node N23; a source electrode T28s connected to the node N22; and a gate electrode T28g fed with the TRS signal that is supplied after a start of the suspension period TR, but before the RSM signal is supplied to the drain electrode T21d of the transistor T21. Note that the TRS signal is an example of a "second control signal" in accordance with the present disclosure. The drain electrode T28d is an example of a "third electrode" in accordance with the present disclosure. The source electrode T28s is an example of a "fourth electrode" in accordance with the present disclosure. The gate electrode T28g is an example of a "second control electrode" in accordance with the present disclosure.

The capacitive element C2 is disposed between the node N22 and the node N21. The capacitive element C2 is a bootstrap capacitor. Note that the capacitive element C2 is an example of a "second capacitive element" in accordance with the present disclosure.

The capacitive element C3 is disposed between the node N23 and the VSS signal line. The capacitive element C3 has a larger electrical capacitance than does the capacitive element C2. As an example, the capacitive element C3 is configured to have an at least three times larger electrical capacitance than is the capacitive element C2. This configuration increases the quantity of the electric charge storable by the capacitive element C3, thereby enabling the capacitive element C2 connected to the node N22 to charge sufficiently after the transistor T28 is turned on.

The node N21 is connected to the (n+1)-th and (n+2)-th stages. The node N22 is connected to the gate electrode T21g. The node N23 is a node for retaining the ON level (signal) when the operation of the gate drive circuit 20 is suspended. Note that the node N21 is an example of a "first output node" in accordance with the present disclosure. The node N22 is an example of a "second output node" in accordance with the present disclosure. The node N23 is an example of a "signal retaining node" in accordance with the present disclosure.

Here, in Embodiment 1, the node N21 is not connected to the gate line 11. Hence, even if the properties of the transistor T21 in the latch circuit 22 have changed, since the latch circuit 22 is not connected to the gate line 11, the changes in the properties of the transistor T21 do not affect the display on the touch panel 1.

Operation of Gate Drive Circuit 20

Figure 7:
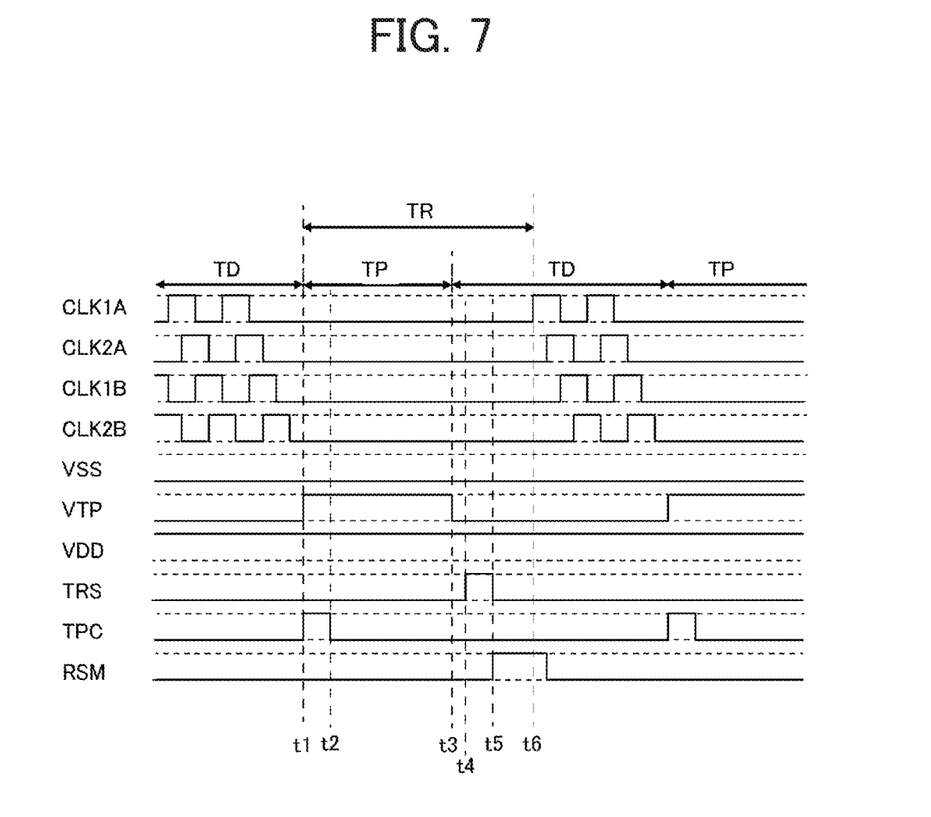
FIG. 7 is a timing diagram of a control signal fed to a gate drive circuit 20.

Next, referring to FIGS. 4 to 7, a description will be given of the operation of the gate drive circuit 20. FIG. 7 is a timing diagram of a control signal fed to the gate drive circuit 20.

Operation of Shift-Register Unit Circuit 21

Referring to FIG. 7, in the display period TD, the CLK1A signal, the CLK2A signal, the CLK1B signal, and CLK2B signal are sequentially fed to the gate drive circuit 20. Referring to FIG. 5, in the shift-register unit circuit 21 in the m-th stage, the transistor T12 is ON by the output signal Qm−2 (SET signal) coming from the (m−2)-th stage before the CLK signal is fed. The node N12 and the capacitive element C1 are hence charged to the ON level. In addition, as the node N12 changes to the ON level, the transistor T14 goes ON, which switches the node N13 to the OFF level. Hence, the transistor T16 and the transistor T17 are turned off.

Then, as the CLK signal is fed, the node N11 changes to the ON level via the transistor T11. Hence, the output signal Qm (gate signal) is outputted to the gate line 11 and the succeeding stage. Then, as the output signal Qm+3 (RESET signal) coming from the (m+3)-th stage is fed to the shift-register unit circuit 21, the transistor T13 is turned on, and the node N12 is turned off to the OFF level. In addition, as the node N12 changes to the OFF level, the transistor T15 goes OFF, which switches the node N13 to the ON level. Hence, the transistor T16 and the transistor T17 both go ON, thereby maintaining the node N12 and the node N11 at the OFF level. This operation is implemented in each stage, so that the output signal Q is outputted sequentially from the shift-register unit circuits 21 in the plurality of stages (the operation of the gate drive circuit 20 is performed).

Then, referring to FIG. 7, as the touch detection period TP and the suspension period TR start at time t1, the VTP signal is supplied to all the shift-register unit circuits 21 as shown in FIG. 4. Referring to FIG. 5, as the VTP signal is supplied to the shift-register unit circuit 21, the transistor T18 goes ON, thereby suspending the output of the output signal Q. In addition, the shift-register unit circuits 21 in the (n−3)-th to (n−1)-th stages are fed with the TPC signal as the RESET signal in the period from time t1 to time t2. Hence, the transistor T13 goes OFF, which switches the node N12 to the OFF level.

Operation of Latch Circuit 22

Referring to FIG. 7, in the display period TD, the CLK signal is fed to the shift-register unit circuit 21, so that the output signal Q is outputted sequentially (the operation of the gate drive circuit 20 is performed). Hence, the output signal Qn−1 (LSET signal) coming from the shift-register unit circuit 21 in the (n−1)-th stage is fed to the latch circuit 22 in the n-th stage as shown in FIG. 6. Hence, the transistor T22 goes ON, which switches the node N23 to the ON level. Hence, the capacitive element C3 is charged.

In addition, the TRS signal is at the OFF level in the display period TD. Hence, the transistor T28 does not go ON, and the node N23 and the node N22 are not connected. As a result of this, the ON level voltage can be retained by the node N23 with no ON level voltage being applied to the gate electrode T21g of the transistor T21.

In addition, the RSM signal is at the OFF level in the display period TD. Hence, the operation of the gate drive circuit 20 is suspended with no output signal Q (SET signal) being outputted to the succeeding stage of the latch circuit 22.

Thereafter, after the touch detection period TP and the suspension period TR start at time t1, the latch circuit 22 is maintained in a state where the ON level voltage is retained by the node N23 (the capacitive element C3 is charged) and also no ON level voltage is applied to the gate electrode T21g of the transistor T21. Hence, the properties of the transistor T21 in the latch circuit 22 can be prevented from changing.

Referring to FIG. 7, the touch detection period TP ends at time t3, and the TRS signal is fed to the latch circuit 22 (the TRS signal switches to the ON level) at time t4. Hence, referring to FIG. 6, the transistor T28 goes ON, which allows electrical conduction between the node N23 and the node N22. As a result of this, the node N22 goes ON, which charges the capacitive element C2. Therefore, the transistor T21 goes ON.

Referring to FIG. 7, at time t5, the TRS signal switches to the OFF level, and the RSM signal switches to the ON level. Hence, referring to FIG. 6, the node N21 switches to the ON level via the transistor T21. Hence, the output signal Qn is outputted to a succeeding stage (e.g., the shift-register unit circuits 21 in the (n+1)-th and (n+2)-th stages). Thereafter, as the supply of the CLK signal is resumed at time t6, the suspension period TR ends, and the operation of the gate drive circuit 20 is resumed.

Then, as the output signal Qn+3 (LRESET signal) coming from the (n+3)-th stage is fed to the latch circuit 22, the transistor T23a and the transistor T23b go ON, which turns off the node N23 and the node N22 to the OFF level. In addition, as the node N23 switches to the OFF level, the transistor T25 goes OFF, which switches the node N24 to the ON level. Hence, the transistor T26 and the transistor T27 both go ON, which maintains the node N22 and the node N21 at the OFF level. As described above, since the ON level (HIGH) voltage is not applied to the gate electrode T21g of the transistor T21 in the suspension period TR until the TRS signal is inputted, the properties of the transistor T21 in the latch circuit 22 can be prevented from changing.

Embodiment 2

Figure 8:
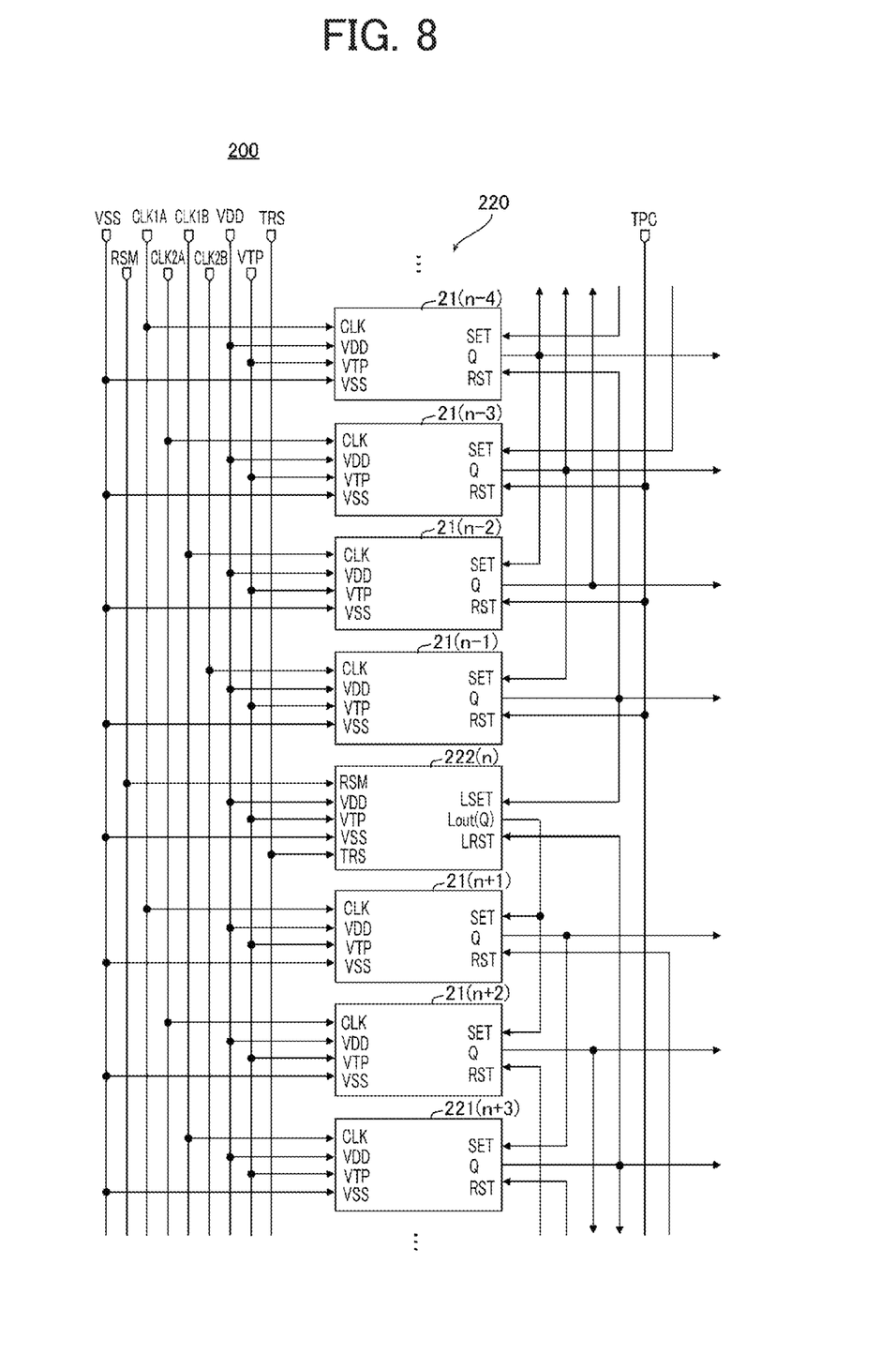
FIG. 8 is a diagram of a structure of a gate drive circuit 220 in a display device 200 in accordance with Embodiment 2.
Figure 9:
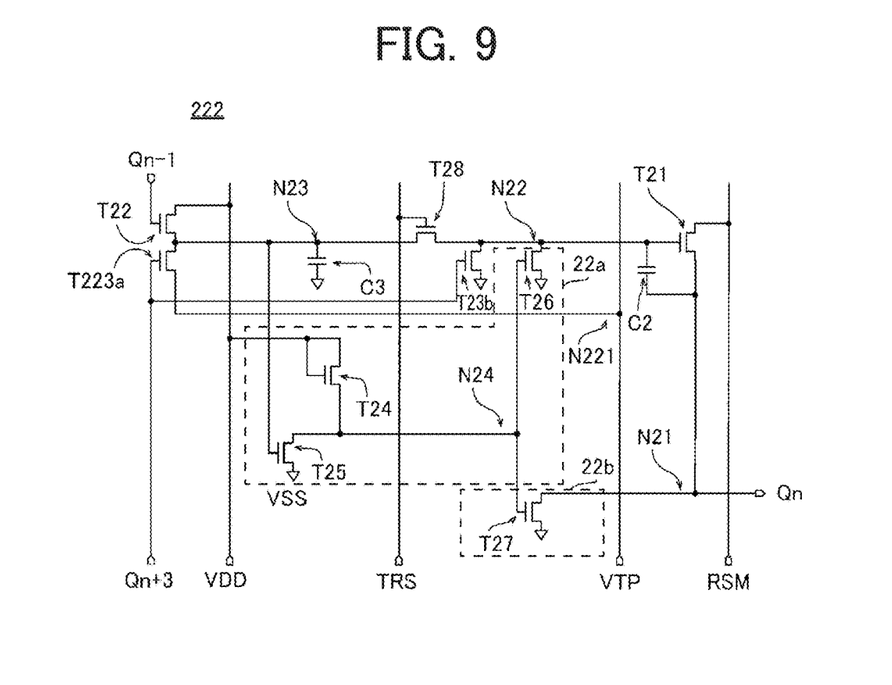
FIG. 9 is a circuit diagram of a latch circuit 222 in accordance with Embodiment 2.

Next, referring to FIGS. 8 and 9, a description will be given of a structure of a display device 200 in accordance with Embodiment 2. The VTP signal is fed to a latch circuit 222 in Embodiment 2. Note that the same structural members as in Embodiment 1 above are denoted by the same reference numerals, and description thereof is not repeated. FIG. 8 is a diagram of a structure of a gate drive circuit 220 in the display device 200 in accordance with Embodiment 2. FIG. 9 is a circuit diagram of the latch circuit 222 in accordance with Embodiment 2.

Referring to FIG. 8, the gate drive circuit 220 in the display device 200 includes the latch circuit 222. The latch circuit 222 is fed with the VTP signal. Referring to FIG. 9, the source electrode of a transistor T223a in the latch circuit 222 is connected to a node N221. The node N221 is fed with the VTP signal. Note that the transistor T223a is an example of a "third transistor" in accordance with the present disclosure. In addition, the VTP signal is an example of a "third control signal" in accordance with the present disclosure. The node N221 is an example of an "input node" in accordance with the present disclosure. The drain electrode of the transistor T223a is an example of a "fifth electrode" in accordance with the present disclosure. The source electrode of the transistor T223a is an example of a "sixth electrode" in accordance with the present disclosure.

In the configuration of Embodiment 2, the electrical potential difference between the drain and source electrodes of the transistor T223a can be reduced in the touch detection period TP. As a result of this, the off leak that could flow through the transistor T223a can be restrained, and therefore the electrical potential of the node N23 can be prevented from changing from the ON level in that period. Note that Embodiment 2 has the same configuration and advantages as Embodiment 1 unless explicitly mentioned here.

Embodiment 3

Figure 10:
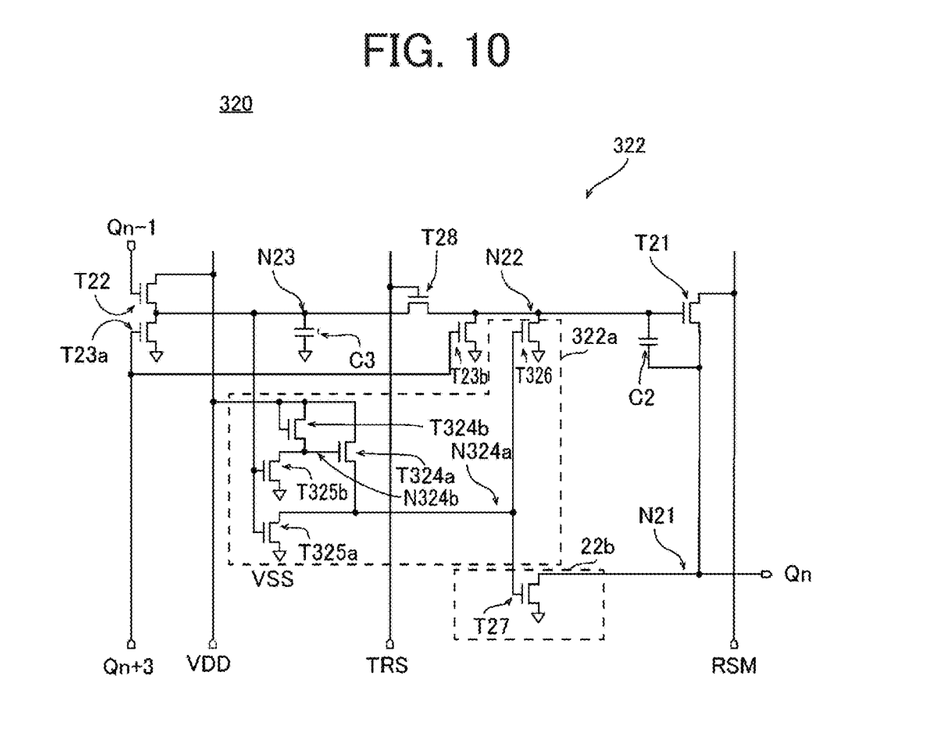
FIG. 10 is a circuit diagram of a latch circuit 322 in a gate drive circuit 320 in accordance with Embodiment 2.

Next, referring to FIG. 10, a description will be given of a structure of a gate drive circuit 320 in accordance with Embodiment 3. In Embodiment 3, transistors in a stabilization circuit 322a in a latch circuit 322 are connected in cascade. Note that the same structural members as in Embodiment 1 above are denoted by the same reference numerals, and description thereof is not repeated. FIG. 10 is a circuit diagram of the latch circuit 322 in the gate drive circuit 320 in accordance with Embodiment 2.

Referring to FIG. 10, the gate drive circuit 320 includes the latch circuit 322. The latch circuit 322 includes the stabilization circuit 322a. The stabilization circuit 322a includes transistors T324a, T324b, T325a, T325b, and T326. The transistor T326 is an example of a "fourth transistor" in accordance with the present disclosure. The drain, source, and gate electrodes of the transistor T326 are an example of a "seventh electrode", an "eighth electrode", and a "fourth control electrode" in accordance with the present disclosure respectively. The transistor T325a is an example of a "fifth transistor" in accordance with the present disclosure. The drain, source, and gate electrodes of the transistor T325a are an example of a "ninth electrode", a "tenth electrode", and a "fifth control electrode" in accordance with the present disclosure respectively. The transistor T325b is an example of a "sixth transistor" in accordance with the present disclosure. The drain, source, and gate electrodes of the transistor T325b are an example of an "eleventh electrode", a "twelfth electrode", and a "sixth control electrode" in accordance with the present disclosure. The transistor T324a is an example of a "seventh transistor" in accordance with the present disclosure. The drain, source, and gate electrodes of the transistor T324a are an example of a "thirteenth electrode", a "fourteenth electrode", and a "seventh control electrode" in accordance with the present disclosure respectively. The transistor T324b is an example of an "eighth transistor" in accordance with the present disclosure. The drain, source, and gate electrodes of the transistor T324b are an example of a "fifteenth electrode", a "sixteenth electrode", and an "eighth control electrode" in accordance with the present disclosure.

In addition, the stabilization circuit 322a includes a node N324a and a node N324b. The node N324a is an example of a "first intermediate node" in accordance with the present disclosure. The node N324b is an example of a "second intermediate node" in accordance with the present disclosure.

The drain electrode of the transistor T326 is connected to the node N22. The source electrode of the transistor T326 is fed with the VSS signal. The gate electrode of the transistor T326 is connected to the node N324a. Note that the electrical potential of the VSS signal is an example of a "first reference potential" in accordance with the present disclosure.

The drain electrode of the transistor T325a is connected to the node N324a. The source electrode of the transistor T325a is fed with the VSS signal. The gate electrode of the transistor T325a is connected to the node N23.

The drain electrode of the transistor T325b is connected to the node N324b. The source electrode of the transistor T325b is fed with the VSS signal. The gate electrode of the transistor T325b is connected to the node N23.

The drain electrode of the transistor T324a is fed with the VDD signal. The source electrode of the transistor T324a is connected to the node N324a. The gate electrode of the transistor T324a is connected to the node N324b. Note that the electrical potential of the VDD signal is an example of a "second reference potential" in accordance with the present disclosure.

The drain and gate electrodes of the transistor T324b are fed with the VDD signal. The source electrode of the transistor T324b is connected to the node N324b.

In the configuration of Embodiment 3, a cascade connection that includes the node N324b is established between the node N23 and the node N324a. Hence, in the period when the node N324a is at the OFF level, the generation of a flow-through current at the node N324a (penetration of the VDD signal) can be prevented, which prevents the penetration of noise into the transistor T326 connected to the node N324a. As a result of this, the properties of the transistor T326 can be prevented from changing. Note that Embodiment 3 has the same configuration and advantages as Embodiment 1 unless explicitly mentioned here.

Embodiment 4

Figure 11:
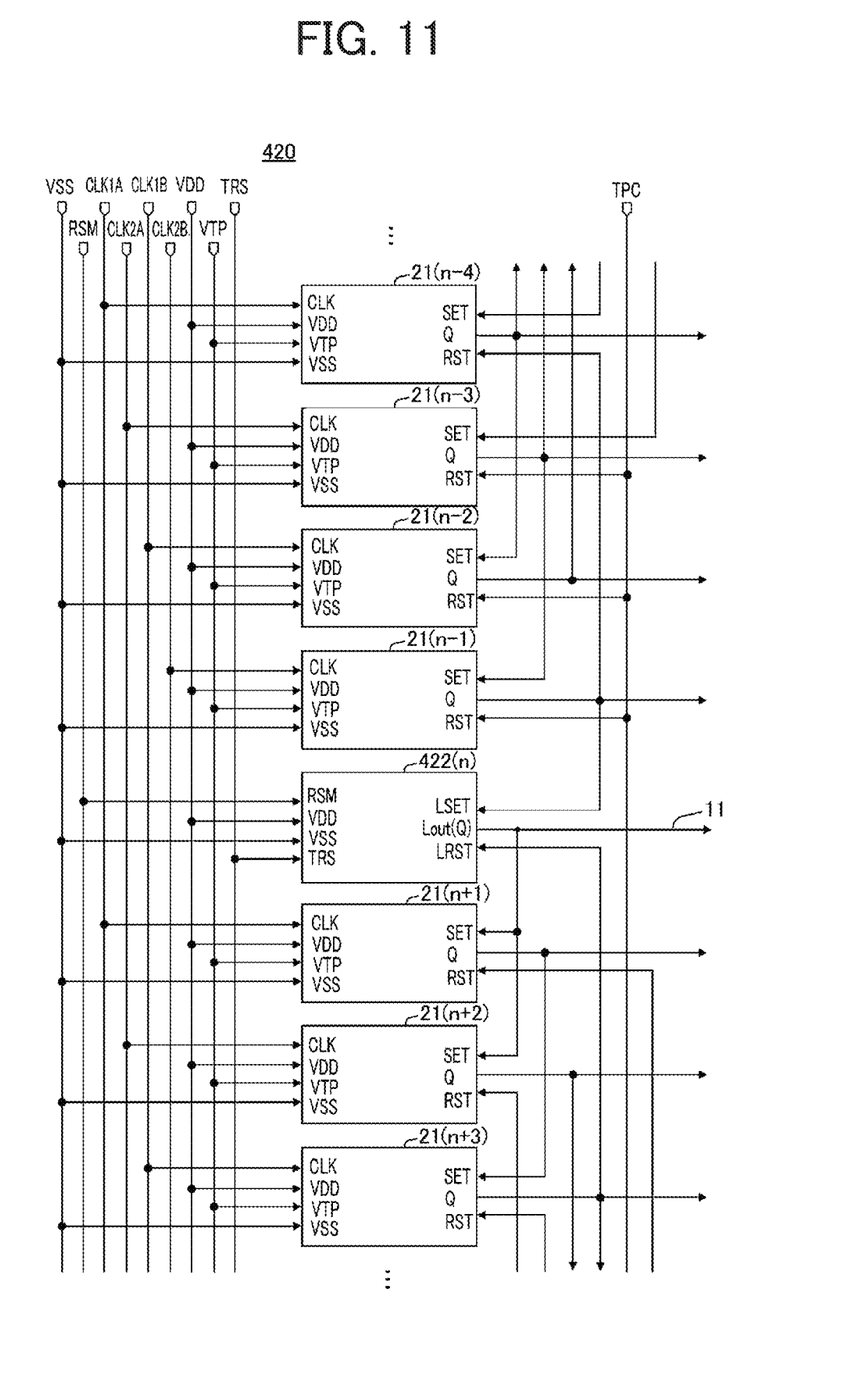
FIG. 11 is a diagram of a structure of a gate drive circuit 420 in accordance with Embodiment 4.

Next, referring to FIG. 11, a description will be given of a structure of a gate drive circuit 420 in accordance with Embodiment 4. In Embodiment 4, a latch circuit 422 is connected to one of the gate lines 11. Note that the same structural members as in Embodiment 1 above are denoted by the same reference numerals, and description thereof is not repeated. FIG. 11 is a diagram of a structure of the gate drive circuit 420 in accordance with Embodiment 4.

Referring to FIG. 11, the gate drive circuit 420 includes the latch circuit 422. The latch circuit 422 is connected to one of the gate lines 11. The latch circuit 422 in the n-th stage outputs the output signal Qn to the gate line 11 and the shift-register unit circuits 21 in the (n+1)-th and (n+2)-th stages. In the structure of Embodiment 4, the latch circuit 422 doubles as a circuit for driving the gate line 11, which enables reducing the size of the gate drive circuit 420. Note that Embodiment 4 has the same configuration and advantages as Embodiment 1 unless explicitly mentioned here.

VARIATIONS AND OTHER EXAMPLES

The embodiments disclosed above are for illustrative purposes only and provide no basis for restrictive interpretations of the present disclosure. The embodiments may be modified for implementation, where appropriate, without departing from the scope of the present disclosure.

Figure 12:
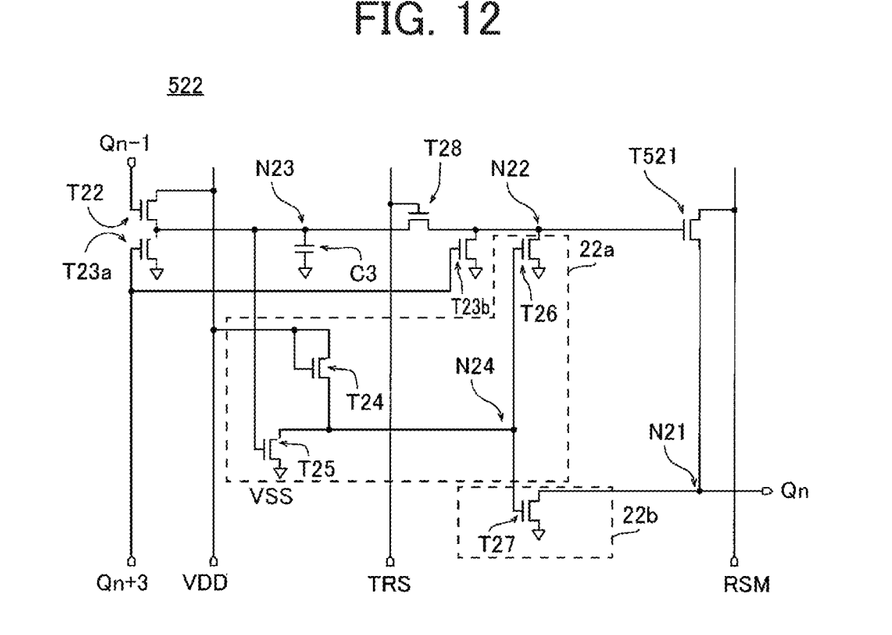
FIG. 12 is a circuit diagram of a latch circuit 522 in accordance with a first variation example of Embodiments 1 to 4.

(1) Embodiments 1 to 4 above describe, as an example, a unit circuit including a capacitive element (bootstrap capacitor), which by no means limits the present disclosure. A transistor T521 is not connected to a capacitive element as in a latch circuit 522 in accordance with a first variation example shown in FIG. 12. In such a case, the function of the capacitive element C2 described in Embodiments 1 to 4 above may be used as the capacitive component of the transistor T521.

Figure 13:
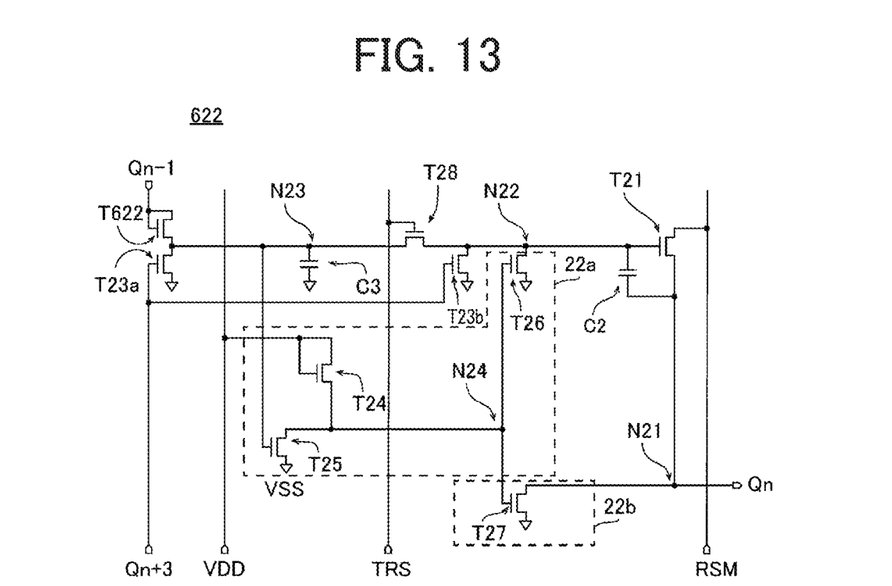
FIG. 13 is a circuit diagram of a latch circuit 622 in accordance with a second variation example of Embodiments 1 to 4.

(2) Embodiments 1 to 4 above describe, as an example, VDD being fed to the drain electrode of a transistor in the turn-on circuit of the unit circuit, which by no means limits the present disclosure. A diode connection may be formed to the node N23 by inputting the LSET signal (output signal Qn−1) to the gate and drain electrodes of a transistor T622 as in the transistor T622 in a latch circuit 622 in accordance with a second variation example shown in FIG. 13.

(3) Embodiments 1 to 4 above describe, as an example, a display device having a touch detection function, which by no means limits the present disclosure. In other words, the display device may not have a touch detection function.

(4) Embodiments 1 to 4 above describe, as an example, four CLK signals being fed to the gate drive circuit, which by no means limits the present disclosure. In other words, the number of CLK signals (the number of phases) may be less than or equal to three and may be more than or equal to five. In addition, the member to which SET signal and RESET signal being the output signal Q are inputted may be designed in any stage in accordance with the number of CLK signals.

(5) Embodiments 1 to 4 above describe, as an example, a display device being built around a liquid crystal display panel including a liquid crystal layer, which by no means limits the present disclosure. As an example, the display device may be built around an organic EL (Electro Luminescence) display panel.

(6) Embodiments 1 to 4 above describe, as an example, the capacitive element C3 having a larger capacitance than does the capacitive element C2, which by no means limits the present disclosure. The capacitive element C3 may be configured to have a smaller capacitance than the capacitive element C2.

A control method for the above-described drive circuit, display device, and in-cell touch panel device may be described as in the following.

A drive circuit of a first configuration includes a plurality of stages and is configured to supply a drive signal to a group of scan signal lines in response to an input of a plurality of clock signals, the drive circuit including a plurality of unit circuits respectively included in the plurality of stages, wherein the plurality of unit circuits include: a shift-register unit circuit connected to one scan signal line among the group of scan signal lines and configured to supply an output signal to the one scan signal line and to a succeeding stage of the shift-register unit circuit; and a latch circuit configured to retain the output signal inputted from a preceding stage in a suspension period in which supply of the plurality of clock signals is suspended to suspend operation of the drive circuit and further configured to supply an output signal to a succeeding stage of the latch circuit when the suspension period ends, the latch circuit includes: a signal retaining node; a turn-on circuit that changes a level of the signal retaining node from an OFF level to an ON level based on the output signal inputted from the preceding stage; a first output node connected to the succeeding stage; a first transistor including: a first electrode to which a first control signal is supplied when the suspension period ends; a second electrode connected to the first output node; and a first control electrode; a second output node connected to the first control electrode; and a second transistor including: a third electrode connected to the signal retaining node; a fourth electrode connected to the second output node; and a second control electrode to which a second control signal is supplied that is supplied after the suspension period starts, but before the first control signal is supplied to the first electrode, the second transistor electrically connects the signal retaining node and the second output node by the second control signal being supplied to the second control electrode, and the first transistor supplies the first control signal as an output signal to the first output node by a level of the second output node switching from the OFF level to the ON level by the signal retaining node and the second output node being electrically connected (first configuration).

According to the first configuration, the first control electrode of the first transistor in the latch circuit is disconnected from the signal retaining node at which the ON level is maintained, in the suspension period in which the operation of the drive circuit is suspended. Hence, this particular configuration can prevent the ON level voltage from being applied continuously to the first control electrode of the first transistor in the suspension period. That in turn enables preventing changes in the properties of the first transistor in the latch circuit.

In the first configuration, the latch circuit may include a first capacitive element connected to the signal retaining node (second configuration).

According to the second configuration, the electrical potential of the second output node can be changed using the electric charge stored in the first capacitive element when the signal retaining node and the second output node are connected.

In the second configuration, the latch circuit may include a second capacitive element connected to the second output node. The first capacitive element may have a larger capacitance than the second capacitive element (third configuration).

According to the third configuration, the first capacitive element stores an increased quantity of electric charge, and therefore the second capacitive element connected to the second output node can be sufficiently charged.

In any one of the first to third configurations, the latch circuit further includes: an input node to which a third control signal is supplied that switches to the ON level in at least a part of the suspension period; and a third transistor including: a fifth electrode connected to the signal retaining node; a sixth electrode connected to the input node; and a third control electrode to which an output signal from a succeeding stage of the latch circuit is inputted (fourth configuration).

According to the fourth configuration, the electrical potential difference between the fifth and sixth electrodes of the third transistor can be reduced in at least a part of the suspension period. As a result of this, the off leak that could flow through the third transistor can be restrained, and therefore the electrical potential of the signal retaining node can be prevented from changing from the ON level in that period.

In any one of the first to fourth configurations, the latch circuit may include: a first intermediate node and a second intermediate node; a fourth transistor including a seventh electrode connected to the second output node, an eighth electrode connected to a first reference potential, and a fourth control electrode connected to the first intermediate node; a fifth transistor including a ninth electrode connected to the first intermediate node, a tenth electrode connected to the first reference potential, and a fifth control electrode connected to the signal retaining node; a sixth transistor including an eleventh electrode connected to the second intermediate node, a twelfth electrode connected to the first reference potential, and a sixth control electrode connected to the signal retaining node; a seventh transistor including a thirteenth electrode connected to a second reference potential, a fourteenth electrode connected to the second intermediate node, and a seventh control electrode connected to the second reference potential; and an eighth transistor including a fifteenth electrode connected to the second reference potential, a sixteenth electrode connected to the first intermediate node, and an eighth control electrode connected to the second intermediate node (fifth configuration).

According to the fifth configuration, a cascade connection that includes the second intermediate node is established between the signal retaining node and the first intermediate node. Hence, the generation of a flow-through current at the first intermediate node can be prevented from the second reference potential, and therefore the penetration of noise into the fourth transistor connected to the first intermediate node can be prevented. As a result of this, the properties of the fourth transistor can be prevented from changing.

In any one of the first to fifth configurations, the first output node may be connected to any one scan signal line among the group of scan signal lines and to the succeeding stage (sixth configuration).

According to the sixth configuration, the latch circuit doubles as a circuit for driving the scan signal lines, and therefore the drive circuit can be reduced in size.

In any one of the first to fifth configurations, the first output node may be connected to the succeeding stage, not to the group of scan signal lines (seventh configuration).

According to the seventh configuration, even if the properties of the first transistor in the latch circuit have changed, since the latch circuit is not connected to the group of scan signal lines, the changes in the properties of the first transistor do not affect the display.

A display device of the eighth configuration includes the drive circuit of any one of the first to seventh configurations; and a display including the group of scan signal lines (eighth configuration).

According to the eighth configuration, a display device can be provided that is capable of preventing changes in the properties of the transistor in the latch circuit.

An in-cell touch panel device of a ninth configuration includes: the drive circuit of any one of the first to seventh configurations; and an in-cell touch panel including the group of scan signal lines and configured to detect a touch made by means of an indicator in the suspension period (ninth configuration).

According to the ninth configuration, an in-cell touch panel device can be provided that is capable of preventing changes in the properties of the transistor in the latch circuit.

The present disclosure is not limited to the description of the embodiments and examples above. Any structure detailed in the embodiments and examples may be replaced by a practically identical structure, a structure that delivers practically the same effect and function, or a structure that achieves practically the same purpose.

What is claimed is:

1. A drive circuit comprising a plurality of stages and configured to supply a drive signal to a group of scan signal lines in response to an input of a plurality of clock signals,
   the drive circuit further comprising a plurality of unit circuits included, respectively, in the plurality of stages, wherein:
   the plurality of unit circuits includes:
     a shift-register unit circuit connected to one scan signal line, among the group of scan signal lines, and configured to supply a first output signal to the one scan signal line and to a succeeding stage of the shift-register unit circuit; and
     a latch circuit configured to retain a second output signal inputted from a preceding stage in a suspension period, in which supply of the plurality of clock signals is suspended to suspend operation of the drive circuit, and further configured to supply a third output signal to a succeeding stage of the latch circuit when the suspension period ends,
   the latch circuit includes:
     a signal retaining node,
     a turn-on circuit that changes a level of the signal retaining node from an OFF level to an ON level based on the second output signal inputted from the preceding stage,
     a first output node connected to the succeeding stage of the latch circuit,
     a first transistor including:
       a first electrode to which a first control signal is supplied when the suspension period ends,
       a second electrode connected to the first output node, and
       a first control electrode,
     a second output node connected to the first control electrode, and
     a second transistor including:
       a third electrode connected to the signal retaining node,
       a fourth electrode connected to the second output node, and
       a second control electrode to which a second control signal is supplied after the suspension period starts, and before the first control signal is supplied to the first electrode,
   the second transistor electrically connects the signal retaining node and the second output node by supplying the second control signal to the second control electrode,
   the first transistor supplies the first control signal, as a fourth output signal, to the first output node by a level of the second output node switching from the OFF level to the ON level and via the signal retaining node and the second output node being electrically connected, and
   the first control electrode is disconnected from the signal retaining node, at which the ON level is maintained, in the suspension period, in which the operation of the drive circuit is suspended.

2. The drive circuit according to claim 1, wherein the latch circuit further includes a first capacitive element connected to the signal retaining node.

3. The drive circuit according to claim 2, wherein
   the latch circuit further includes a second capacitive element connected to the second output node, and
   the first capacitive element has a capacitance larger than a capacitance of the second capacitive element.

4. The drive circuit according to claim 3, wherein the first output node is connected to one scan signal line, among the group of scan signal lines, and to the succeeding stage of the latch circuit.

5. A display device comprising:
   the drive circuit according to claim 3; and
   a display including the group of scan signal lines.

6. An in-cell touch panel device comprising:
   the drive circuit according to claim 3; and
   an in-cell touch panel including the group of scan signal lines and configured to detect a touch made by means of an indicator in the suspension period.

7. The drive circuit according to claim 1, wherein the latch circuit further includes:
   an input node to which a third control signal is supplied, the third control signal switching to the ON level in at least a part of the suspension period, and
   a third transistor including:
     a fifth electrode connected to the signal retaining node,
     a sixth electrode connected to the input node, and
     a third control electrode to which the third output signal from the succeeding stage of the latch circuit is inputted.

8. The drive circuit according to claim 7, wherein the first output node is connected to one scan signal line, among the group of scan signal lines, and to the succeeding stage of the latch circuit.

9. A display device comprising:
   the drive circuit according to claim 7; and
   a display including the group of scan signal lines.

10. An in-cell touch panel device comprising:
    the drive circuit according to claim 7; and
    an in-cell touch panel including the group of scan signal lines and configured to detect a touch made by means of an indicator in the suspension period.

11. The drive circuit according to claim 1, wherein the first output node is connected to one scan signal line, among the group of scan signal lines, and to the succeeding stage of the latch circuit.

12. A display device comprising:
    the drive circuit according to claim 1; and
    a display including the group of scan signal lines.

13. The drive circuit according to claim 1, wherein
    the latch circuit further includes:
      a ninth transistor connected to the first control electrode of the first transistor, and in the suspension period until a TRS signal is inputted, the ninth transistor is ON, such that the first control electrode is at the OFF level.

14. A drive circuit comprising a plurality of stages and configured to supply a drive signal to a group of scan signal lines in response to an input of a plurality of clock signals,
    the drive circuit further comprising a plurality of unit circuits included, respectively, in the plurality of stages, wherein:

the plurality of unit circuits includes:
a shift-register unit circuit connected to one scan signal line, among the group of scan signal lines, and configured to supply a first output signal to the one scan signal line and to a succeeding stage of the shift-register unit circuit; and
a latch circuit configured to retain a second output signal inputted from a preceding stage in a suspension period, in which supply of the plurality of clock signals is suspended to suspend operation of the drive circuit, and further configured to supply a third output signal to a succeeding stage of the latch circuit when the suspension period ends,
the latch circuit includes:
a signal retaining node,
a turn-on circuit that changes a level of the signal retaining node from an OFF level to an ON level based on the second output signal inputted from the preceding stage,
a first output node connected to the succeeding stage of the latch circuit,
a first transistor including:
a first electrode to which a first control signal is supplied when the suspension period ends,
a second electrode connected to the first output node, and
a first control electrode,
a second output node connected to the first control electrode, and
a second transistor including:
a third electrode connected to the signal retaining node,
a fourth electrode connected to the second output node, and
a second control electrode to which a second control signal is supplied after the suspension period starts, and before the first control signal is supplied to the first electrode,
the second transistor electrically connects the signal retaining node and the second output node by supplying the second control signal to the second control electrode,
the first transistor supplies the first control signal, as a fourth output signal, to the first output node by a level of the second output node switching from the OFF level to the ON level and via the signal retaining node and the second output node being electrically connected, and
the latch circuit further includes:
a first intermediate node and a second intermediate node,
a fourth transistor including a seventh electrode connected to the second output node, an eighth electrode connected to a first reference potential, and a fourth control electrode connected to the first intermediate node,
a fifth transistor including a ninth electrode connected to the first intermediate node, a tenth electrode connected to the first reference potential, and a fifth control electrode connected to the signal retaining node,
a sixth transistor including an eleventh electrode connected to the second intermediate node, a twelfth electrode connected to the first reference potential, and a sixth control electrode connected to the signal retaining node, a seventh transistor including a thirteenth electrode connected to a second reference potential, a fourteenth electrode connected to the second intermediate node, and a seventh control electrode connected to the second reference potential, and
an eighth transistor including a fifteenth electrode connected to the second reference potential, a sixteenth electrode connected to the first intermediate node, and an eighth control electrode connected to the second intermediate node.

15. The drive circuit according to claim 14, wherein the first output node is connected to one scan signal line, among the group of scan signal lines, and to the succeeding stage of the latch circuit.

16. A display device comprising:
the drive circuit according to claim 14; and
a display including the group of scan signal lines.

17. An in-cell touch panel device comprising:
the drive circuit according to claim 14; and
an in-cell touch panel including the group of scan signal lines and configured to detect a touch made by means of an indicator in the suspension period.

18. A drive circuit comprising a plurality of stages and configured to supply a drive signal to a group of scan signal lines in response to an input of a plurality of clock signals,
the drive circuit further comprising a plurality of unit circuits included, respectively, in the plurality of stages, wherein:
the plurality of unit circuits includes:
a shift-register unit circuit connected to one scan signal line, among the group of scan signal lines, and configured to supply a first output signal to the one scan signal line and to a succeeding stage of the shift-register unit circuit; and
a latch circuit configured to retain a second output signal inputted from a preceding stage in a suspension period, in which supply of the plurality of clock signals is suspended to suspend operation of the drive circuit, and further configured to supply a third output signal to a succeeding stage of the latch circuit when the suspension period ends,
the latch circuit includes:
a signal retaining node,
a turn-on circuit that changes a level of the signal retaining node from an OFF level to an ON level based on the second output signal inputted from the preceding stage,
a first output node connected to the succeeding stage of the latch circuit,
a first transistor including:
a first electrode to which a first control signal is supplied when the suspension period ends,
a second electrode connected to the first output node, and
a first control electrode,
a second output node connected to the first control electrode, and
a second transistor including:
a third electrode connected to the signal retaining node,
a fourth electrode connected to the second output node, and
a second control electrode to which a second control signal is supplied after the suspension period starts, and before the first control signal is supplied to the first electrode, the second transistor electrically connects the signal retaining node and the second output node by supplying the second control signal to the second control electrode, the first transistor supplies the first control signal, as a fourth output signal, to the first output node by a level of the second output node switching from the OFF level to the ON level and via the signal retaining node and the second output node being electrically connected, and the first output node is connected to the succeeding stage of the latch circuit, and not to the group of scan signal lines.

19. A display device comprising:
the drive circuit according to claim 18; and
a display including the group of scan signal lines.

20. An in-cell touch panel device comprising:
the drive circuit according to claim 18; and
an in-cell touch panel including the group of scan signal lines and configured to detect a touch made by means of an indicator in the suspension period.

* * * * *